(12) United States Patent
Agrawal

(10) Patent No.: US 8,057,578 B2
(45) Date of Patent: Nov. 15, 2011

(54) METHOD FOR TREATMENT OF PROCESS WATERS

(75) Inventor: Ravindra K. Agrawal, Houston, TX (US)

(73) Assignee: Kellogg Brown & Root LLC, Houston, TX (US)

(*) Notice: Subject to any disclaimer, the term of this patent is extended or adjusted under 35 U.S.C. 154(b) by 804 days.

(21) Appl. No.: 11/954,440

(22) Filed: Dec. 12, 2007

(65) Prior Publication Data
US 2009/0152209 A1   Jun. 18, 2009

(51) Int. Cl.
*B01D 19/00* (2006.01)
(52) U.S. Cl. ........... 95/159; 95/168; 95/170; 95/263; 95/264; 422/168
(58) Field of Classification Search .......... 95/162, 95/263, 264, 254, 156, 159, 168, 170; 422/168
See application file for complete search history.

(56) References Cited

U.S. PATENT DOCUMENTS

| | | | |
|---|---|---|---|
| 2,773,003 A | 12/1956 | Brown et al. | |
| 2,930,753 A | 3/1960 | McMahon | |
| 2,940,920 A | 6/1960 | Garwin | |
| 3,754,376 A | 8/1973 | Kent | |
| 3,966,633 A | 6/1976 | Friedman | |
| 3,975,396 A | 8/1976 | Bushnell et al. | |
| 4,032,618 A * | 6/1977 | Matthews | 423/351 |
| 4,039,429 A | 8/1977 | van Klinken et al. | |
| 4,191,639 A | 3/1980 | Audeh et al. | |
| 4,200,519 A | 4/1980 | Kwant et al. | |
| 4,236,973 A | 12/1980 | Robbins | |
| 4,290,880 A | 9/1981 | Leonard | |
| 4,324,651 A | 4/1982 | Rollmann et al. | |
| 4,354,922 A | 10/1982 | Derbyshire et al. | |
| 4,354,928 A | 10/1982 | Audeh et al. | |
| 4,421,639 A | 12/1983 | Lambert et al. | |
| 4,440,633 A | 4/1984 | Jacquin et al. | |
| 4,482,453 A | 11/1984 | Coombs et al. | |
| 4,502,950 A | 3/1985 | Ikematsu et al. | |
| 4,525,269 A | 6/1985 | Ikematsu et al. | |
| 4,547,292 A | 10/1985 | Zarchy | |
| 4,547,293 A | 10/1985 | King et al. | |
| 4,801,356 A | 1/1989 | Grasso | |
| 4,810,367 A | 3/1989 | Chombart et al. | |
| 4,816,040 A | 3/1989 | Bonville et al. | |
| 4,933,067 A | 6/1990 | Rankel | |
| 5,089,114 A | 2/1992 | Tovar et al. | |
| 5,132,007 A * | 7/1992 | Meyer et al. | 208/427 |
| 5,192,421 A | 3/1993 | Audeh et al. | |
| 5,368,700 A | 11/1994 | Bachmann | |
| 5,545,330 A | 8/1996 | Ehrlich | |
| 5,609,765 A * | 3/1997 | Bowman | 210/638 |
| 5,651,833 A | 7/1997 | Bremer et al. | |
| 5,843,303 A | 12/1998 | Ganeshan | |
| 5,914,010 A | 6/1999 | Hood et al. | |
| 5,919,355 A | 7/1999 | Hood | |
| 6,110,385 A | 8/2000 | Copa et al. | |
| 6,274,032 B2 | 8/2001 | Hood et al. | |
| 6,332,975 B1 | 12/2001 | Abdel-Halim et al. | |

(Continued)

*Primary Examiner* — Robert A Hopkins
(74) *Attorney, Agent, or Firm* — KBR IP Legal Dept.

(57) ABSTRACT

Systems and methods for treating water. Water containing one or more thermally destructible contaminants can be contacted with one or more oxidants to provide an effluent containing essentially contaminant-free water and a recycle containing the one or more oxidants and at least a portion of the one or more thermally destructible contaminants. The one or more thermally destructible contaminants in the recycle can be thermally destroyed using one or more combustion processes.

19 Claims, 4 Drawing Sheets

U.S. PATENT DOCUMENTS

| | | |
|---|---|---|
| 6,524,469 B1 | 2/2003 | Schucker |
| 6,533,925 B1 | 3/2003 | Wallace et al. |
| 6,533,945 B2 | 3/2003 | Shah |
| 6,610,112 B1 * | 8/2003 | Klock et al. ............ 48/214 R |
| 6,780,331 B2 | 8/2004 | Galatro et al. |
| 7,105,039 B2 | 9/2006 | Decker |
| 7,144,498 B2 | 12/2006 | McCall et al. |
| 2008/0081844 A1 * | 4/2008 | Shires et al. ............ 518/703 |

* cited by examiner

METHOD FOR TREATMENT OF PROCESS WATERS

BACKGROUND

1. Field

The present embodiments generally relate to the treatment of process water streams. More particularly, embodiments of the present invention relate to the treatment of process water streams generated by a hydrocarbon gasification process.

2. Description of the Related Art

Gasification is a high-temperature process for converting carbonaceous materials into carbon monoxide and hydrogen gas. Since the mixture of carbon monoxide and hydrogen is often used for the subsequent synthesis of both organic and inorganic chemicals, the gas is often referred to as "synthesis gas" or, more succinctly "syngas." Syngas can be used as a fuel to generate electricity or steam, as a raw material for chemical production, and as a source of hydrogen.

Typical feeds to gasification include petroleum-based materials that are neat or residues of processing materials, such as heavy crude oil, bitumen recovered from tar sands, kerogen from oil shale, coke, and other high-sulfur and/or high metal-containing residues; gases; and various carbonaceous waste materials. Dry or slurried feedstock is reacted in the gasifier in a reducing atmosphere and at high temperatures and pressures. The resulting syngas typically contains about 85 percent of the feed carbon content as carbon monoxide and hydrogen, with the balance being a mixture of carbon dioxide, water vapor and methane. The syngas can exit the gasifier at temperatures from about 1,000° F. to about 2,900° F. Contaminants present in the gasifier feedstock, such as sulfur containing compounds, halogenated compounds, and ammonia containing compounds will be present in the high-temperature syngas exiting the gasifier.

This high-temperature syngas can be purified for subsequent use as a process feedstock, however most process equipment used to clean impurities and contaminants from the syngas operate at temperatures far lower than the gasifier exit temperature. Thus, the syngas requires substantial cooling prior to subsequent processing. First stage cooling is typically accomplished using non-contact heat exchange with water, cooled syngas, or other relatively cool media. Reducing the temperature of the syngas below the dew point condenses a portion of the water present in the syngas. As the water vapor condenses, contaminants present in the syngas, such as hydrogen sulfide, hydrogen chloride, ammonia, and hydrocarbons, are absorbed into the condensate. Direct cooling methods such as wet venturi scrubbing, quenching, or the equivalent, are often used to effectuate second stage cooling of the syngas. While direct contact cooling can efficiently drop the syngas temperature to about 400° F. to about 700° F., the voluminous quantity of cooling water contacting the syngas entrains significant additional contaminants. Thus, both the condensate from the non-contact first cooling stage and the contact cooling water from the second cooling stage require treatment prior to discharge.

Frequently, the process condensate and contact cooling water are combined and treated in large-scale industrial or publicly-owned treatment facilities. However, where gasification processes are employed in remote locations such dedicated treatment infrastructure is often unavailable or lacks sufficient hydraulic capacity to adequately handle the large, continuous, volumes of water generated.

There is a need therefore for a method for efficiently and economically treating the relatively large volume of water generated by a hydrocarbon gasification process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for treating water are provided. Water containing one or more thermally destructible contaminants can be contacted with one or more oxidants to provide an effluent containing essentially contaminant-free water and a recycle containing the one or more oxidants and at least a portion of the one or more thermally destructible contaminants. The one or more thermally destructible contaminants in the recycle can be thermally destroyed using one or more combustion processes, for example a hydrocarbon gasification process.

As used herein, "thermally destructible contaminants" can include, but are not limited to, any compound and/or chemical species that can be physically degraded and/or decomposed by subjecting the compound to a temperature greater than 100° C. (210° F.). Illustrative examples include, but are not limited to, hydrocarbons, ammonia, and organic compounds.

As used herein, "oxidants" and "oxidizers" can include, but are not limited to, air, oxygen, oxygen-enriched air, ozone, nitrous oxide, other oxidizing compounds, mixtures thereof, derivatives thereof and/or combinations thereof. In one or more embodiments, air, oxygen, and/or oxygen-enriched air can be supplied using an air separation unit. The term "oxygen-enriched air" refers to air having an oxygen concentration greater than about 22% vol.

Figure 1:
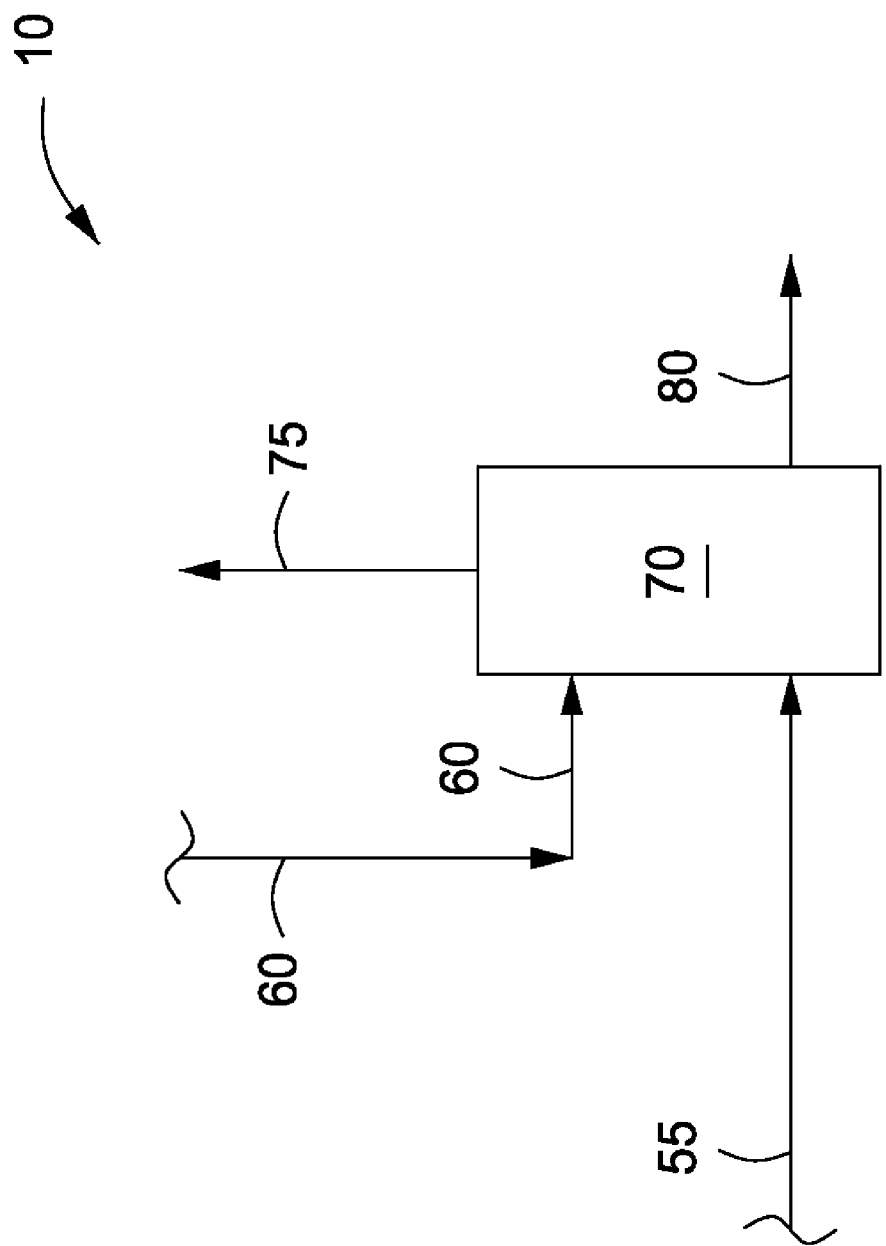
FIG. 1 depicts an illustrative treatment system for treating water according to one or more embodiments described.

FIG. 1 depicts an illustrative treatment system for treating water according to one or more embodiments. In one or more embodiments, water and one or more thermally destructible contaminants ("first effluent") in line 60, and one or more oxidants, supplied via line 55 can be contacted, mixed, or otherwise combined within one or more separators 70 providing an oxidant concentration in the first effluent of from about 0.1% wt to about 10% wt; from about 0.25% wt to about 5% wt; or from about 0.5% wt to about 2.5% wt. A recycle ("first recycle") via line 75, containing at least a portion of the one or more oxidants and at least a portion of the one or more thermally destructible contaminants can be withdrawn from the overhead of the separator 70. An effluent ("third effluent") via line 80 containing essentially contaminant-free water can be withdrawn from the bottom of the separator 70. In one or more embodiments, the first recycle can be returned to a combustion process, for example a hydrocarbon gasification process, wherein the one or more thermally destructible contaminants can be decomposed.

In one or more embodiments, the first effluent in line 60 can contain the water and the one or more thermally destructible contaminants. In one or more embodiments, the ammonia concentration in the first effluent can range from about 500 ppmw to about 3% wt; about 500 ppmw to about 2% wt; or about 500 ppmw to about 1% wt. In one or more embodiments, the hydrocarbon concentration in the first effluent can range from about 500 ppmw to about 3% wt; about 500 ppmw to about 2% wt; or about 500 ppmw to about 1% wt. In one or more embodiments, the temperature of the first effluent can range from about 10° C. (50° F.) to about 200° C. (390° F.); about 20° C. (70° F.) to about 150° C. (300° F.); or about 30° C. (85° F.) to about 125° C. (260° F.). In one or more embodiments, the first effluent pressure can range from about 100 kPa (0 psig) to about 5,000 kPa (710 psig); about 100 kPa (0 psig) to about 2,000 kPa (275 psig); or about 100 kPa (0 psig) to about 1,000 kPa (130 psig).

In one or more embodiments, the first recycle via line 75 can contain the one or more oxidants and at least a portion of the one or more thermally destructible contaminants. In one or more embodiments, the ammonia concentration in the first recycle can range from about 500 ppmw to about 3% wt; about 500 ppmw to about 2% wt; or about 500 ppmw to about 1% wt. In one or more embodiments, the hydrocarbon concentration in the first recycle can range from about 500 ppmw to about 3% wt; about 500 ppmw to about 2% wt; or about 500 ppmw to about 1% wt. In one or more embodiments, the temperature of the first recycle can range from about 100° C. (210° F.) to about 250° C. (480° F.); about 150° C. (300° F.) to about 225° C. (435° F.); or about 175° C. (345° F.) to about 220° C. (430° F.). In one or more embodiments, the pressure of the first recycle in line 75 can range from about 515 kPa (60 psig) to about 4,000 kPa (565 psig); about 515 kPa (60 psig) to about 3,000 kPa (420 psig); or about 515 kPa (60 psig) to about 2,000 kPa (275 psig).

In one or more embodiments, the third effluent in line 80 can contain water and low levels of dissolved organic compounds, ammonia and ammonia containing compounds, mixtures thereof, derivatives thereof and/or combinations thereof. In one or more embodiments, the ammonia concentration in the third effluent can range from about 0.1 ppmw to about 50 ppmw; about 0.1 ppmw to about 25 ppmw; or about 0.1 ppmw to about 10 ppmw. In one or more embodiments, the hydrocarbon concentration in the third effluent can range from about 1 ppmw to about 50 ppmw; about 1 ppmw to about 25 ppmw; or about 1 ppmw to about 10 ppmw. In one or more embodiments, the temperature of the third effluent can range from about 25° C. (80° F.) to about 95° C. (200° F.); about 30° C. (85° F.) to about 65° C. (150° F.); or about 30° C. (85° F.) to about 55° C. (130° F.). In one or more embodiments, the pressure of the third effluent in line 80 can range from about 100 kPa (0 psig) to about 1,000 kPa (130 psig); about 200 kPa (15 psig) to about 700 kPa (90 psig); or about 200 kPa (15 psig) to about 600 kPa (75 psig).

In one or more embodiments, all or a portion of the third effluent in line 80 can be treated, reused and/or recycled to meet process and/or utility water requirements, for example as boiler feedwater, cooling water, and/or process water. In one or more embodiments, at least a portion of the third effluent in line 80 can be introduced to one or more boiler feedwater treatment systems including, but not limited to, ion exchange, reverse osmosis, ultra-filtration, or any combination thereof. In one or more embodiments, at least a portion of the third effluent in line 80 can be used as cooling water in one or more closed and/or open-loop cooling systems (not shown). In one or more embodiments, at least a portion of the third effluent can be recycled for use as process water in a hydrocarbon gasification process (not shown). In one or more embodiments, a minimum of about 5% wt, about 25% wt, about 50% wt, about 75% wt, about 95% wt, or about 99.9% wt of the third effluent in line 80 can be treated and reused as boiler feed water. In one or more embodiments, a minimum of about 5% wt, about 25% wt, about 50% wt, about 75% wt, about 95% wt, or about 99.9% wt of the third effluent can be treated and reused as cooling water. In one or more embodiments, a minimum of about 5% wt, about 25% wt, about 50% wt, about 75% wt, about 95% wt, or about 99.9% wt of the third effluent can be treated and reused as process water in a hydrocarbon gasification process.

In one or more embodiments, the first recycle in line 75 can supply at least a part of the oxidant requirement of a chemical process (not shown). Although not shown in FIG. 1, in one or more embodiments, the first recycle can be used to supply at least a part of the oxidant required for one or more hydrocarbon gasifiers.

In one or more embodiments, the one or more separators 70 can be a column containing trays, rings, balls, or saddles in any frequency and/or combination thereof. In one or more embodiments, the separator 70 can be a partially or completely empty column. In one or more embodiments, the operating temperature of the separator 70 can range from about 20° C. (70° F.) to about 100° C. (210° F.), about 20° C. (70° F.) to about 70° C. (160° F.), or about 20° C. (70° F.) to about 50° C. (120° F.). In one or more embodiments, the operating pressure of the separator 70 can range from about 100 kPa (0 psig) to about 5,000 kPa (710 psig); about 100 kPa (0 psig) to about 2,000 kPa (275 psig); or about 100 kPa (0 psig) to about 1,000 kPa (130 psig).

Figure 2:
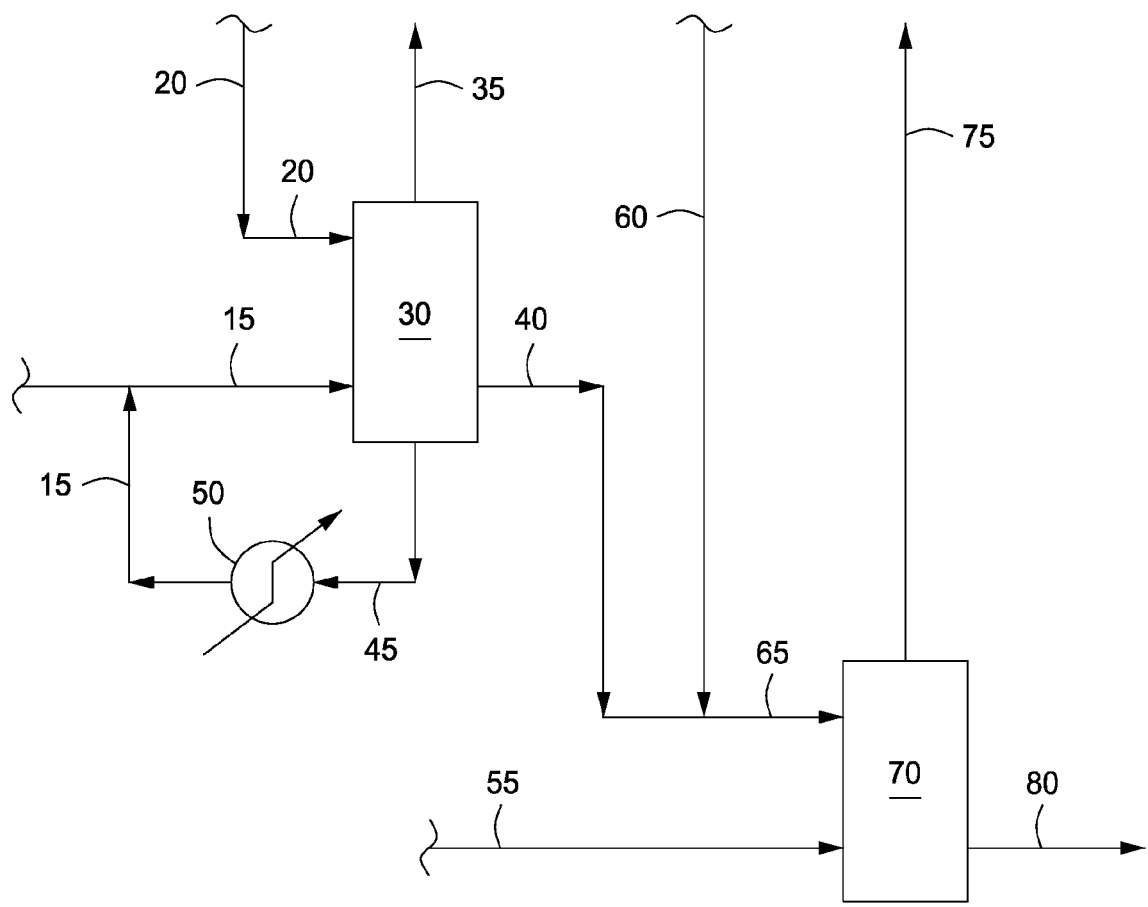
FIG. 2 depicts another illustrative treatment system for treating water according to one or more embodiments described.

FIG. 2 depicts another illustrative treatment system for treating water according to one or more embodiments. In one or more embodiments, water containing both thermally destructible and thermally indestructible contaminants ("second effluent") in line 20 and steam via line 15 can be introduced to one or more separators 30. In one or more embodiments, the steam-to-second effluent weight ratio can range from about 1:1 to about 20:1; about 2:1 to about 15:1; or about 5:1 to about 10:1. The steam, containing at least a portion of the one or more thermally indestructible contaminants can be withdrawn as an overhead ("second recycle") via line 35 from the separator 30. The water, containing the one or more thermally destructible contaminants can be withdrawn as a bottoms ("second intermediate") via line 40 from the separator 30. In one or more embodiments, the second recycle can be returned to a recovery process, for example an acid gas unit in a hydrocarbon gasification process (not shown), wherein the one or more thermally indestructible contaminants can be treated, removed and/or recovered.

As used herein the term "thermally indestructible contaminants" can include any compound which is not readily degraded and/or decomposed by exposure to temperatures in excess of 100° C. (210° F.). Illustrative include, but are not limited to, hydrogen sulfide ($H_2S$), hydrogen chloride (HCl), and carbonyl sulfide (COS).

In one or more embodiments, the second effluent in line 20 can contain the water, the one or more thermally indestructible contaminants, and one or more thermally destructible contaminants. In one or more embodiments, the hydrogen sulfide concentration in the second effluent can range from about 500 ppmw to about 3% wt; about 500 ppmw to about 2% wt; or about 500 ppmw to about 1% wt. In one or more embodiments, the hydrogen chloride concentration in the second effluent can range from about 500 ppmw to about 3% wt; about 500 ppmw to about 2% wt; or about 500 ppmw to about 1% wt. In one or more embodiments, the carbonyl sulfide concentration in the second effluent can range from about 500 ppmw to about 3% wt; about 500 ppmw to about 2% wt; or about 500 ppmw to about 1% wt. In one or more embodiments, the ammonia concentration in the second effluent can range from about 500 ppmw to about 3% wt; about 500 ppmw to about 2% wt; or about 500 ppmw to about 1% wt. In one or more embodiments, the hydrocarbon concentration in the second effluent can range from about 500 ppmw to about 3% wt; about 500 ppmw to about 2% wt; or about 500 ppmw to about 1% wt. In one or more embodiments, the temperature of the second effluent can range from about 40° C. (105° F.) to about 260° C. (500° F.); about 90° C. (195° F.) to about 200° C. (390° F.); or about 90° C. (195° F.) to about 150° C. (300° F.). In one or more embodiments, the pressure of the second effluent in line 20 can range from about 100 kPa (0 psig) to about 3,000 kPa (420 psig); about 100 kPa (0 psig) to about 2,000 kPa (275 psig); or about 100 kPa (0 psig) to about 1,000 kPa (130 psig).

In one or more embodiments, the second recycle in line 35 can contain the steam and at least a portion of the one or more thermally indestructible contaminants. In one or more embodiments, the hydrogen sulfide concentration in the second recycle can range from about 500 ppmw to about 3% wt; about 500 ppmw to about 2% wt; or about 500 ppmw to about 1% wt. In one or more embodiments, the hydrogen chloride concentration in the second recycle can range from about 500 ppmw to about 3% wt; about 500 ppmw to about 2% wt; or about 500 ppmw to about 1% wt. In one or more embodiments, the carbonyl sulfide concentration in the second recycle can range from about 500 ppmw to about 3% wt; about 500 ppmw to about 2% wt; or about 500 ppmw to about 1% wt. In one or more embodiments, the temperature of the second recycle in line 35 can range from about 100° C. (210° F.) to about 230° C. (445° F.); about 140° C. (285° F.) to about 210° C. (410° F.); or about 160° C. (320° F.) to about 190° C. (375° F.). In one or more embodiments, the pressure of the second recycle in line 35 can range from about 200 kPa (15 psig) to about 3,000 kPa (420 psig); about 500 kPa (60 psig) to about 2,000 kPa (275 psig); or about 750 kPa (95 psig) to about 1,500 kPa (200 psig).

In one or more embodiments, the second intermediate in line 40 can contain the water and the one or more thermally destructible contaminants. In one or more embodiments, the ammonia concentration in the second intermediate can range from about 500 ppmw to about 3% wt; about 500 ppmw to about 2% wt; or about 500 ppmw to about 1% wt. In one or more embodiments, the hydrocarbon concentration in the second intermediate can range from about 500 ppmw to about 3% wt; about 500 ppmw to about 2% wt; or about 500 ppmw to about 1% wt. In one or more embodiments, the temperature of the second intermediate in line 40 can range from about 40° C. (105° F.) to about 150° C. (300° F.); about 60° C. (140° F.) to about 135° C. (275° F.); or about 75° C. (165° F.) to about 110° C. (230° F.). In one or more embodiments, the pressure of the second intermediate in line 40 can range from about 200 kPa (15 psig) to about 3,000 kPa (420 psig); about 500 kPa (60 psig) to about 2,000 kPa (275 psig); or about 750 kPa (95 psig) to about 1,500 kPa (200 psig).

In one or more embodiments, the steam in line 15 can be generated using one or more reboilers 50. In one or more embodiments, make-up water for the reboiler can be drafted via line 45 from the separator 30. In one or more embodiments, the steam in line 15 can be saturated. In one or more embodiments, the pressure of the steam in line 15 can range from about 200 kPa (15 psig) to about 1,500 kPa (200 psig), about 300 kPa (30 psig) to about 1,000 kPa (130 psig), or about 400 kPa (45 psig) to about 800 kPa (100 psig). In one or more embodiments, all or a portion of the steam in line 15 can be supplied using an external source of steam, for example a commercial and/or industrial distribution system.

In one or more embodiments, the one or more separators 30 can be a column containing trays, rings, balls, saddles or any combination thereof. In one or more embodiments, the separator 30 can be a partially or completely empty column. In one or more embodiments, the one or more separators 30 can operate at a temperature of about 25° C. (80° F.) to about 100° C. (210° F.), about 50° C. (120° F.) to about 90° C. (195° F.), or about 60° C. (140° F.) to about 80° C. (175° F.). In one or more embodiments, the one or more separators 30 can operate at a pressure of about 100 kPa (0 psig) to about 1,500 kPa (200 psig), about 200 kPa (15 psig) to about 1,000 kPa (130 psig), or about 400 kPa (45 psig) to about 800 kPa (100 psig).

In one or more embodiments, the one or more reboilers 50 can include any system, device or combination of systems and/or devices to generate the steam supply via line 15. In one or more embodiments, the reboiler 50 can include, but is not limited to, shell-and-tube, U-tube, bayonet, and regenerative type heat exchangers with heat supplied using a hot process fluid, a heat transfer fluid or the like. In one or more embodiments, the reboiler 50 can be a direct fired boiler. In one or more embodiments, the reboiler 50 can operate at a pressure from about 100 kPa (0 psig) to about 1,500 kPa (200 psig), about 200 kPa (15 psig) to about 1,000 kPa (130 psig), or about 400 kPa (45 psig) to about 800 kPa (100 psig).

In one or more embodiments, the second intermediate via line 40 can be combined with one or more other waters, each containing one or more thermally destructible contaminants. In one or more specific embodiments, the second intermediate in line 40 can be combined with the first effluent via line 60 to provide a feed via line 65. The feed via line 65 and one or more oxidants supplied via line 55 can be introduced to the one or more separators 70. As described in detail with regard to FIG. 1, within the separator 70, the oxidant(s) and one or more thermally destructible contaminants can be selectively separated from the water to provide the first recycle via line 75, containing the one or more oxidants and at least a portion of the one or more thermally destructible contaminants, and the third effluent via line 80, containing essentially contaminant-free water.

Figure 3:
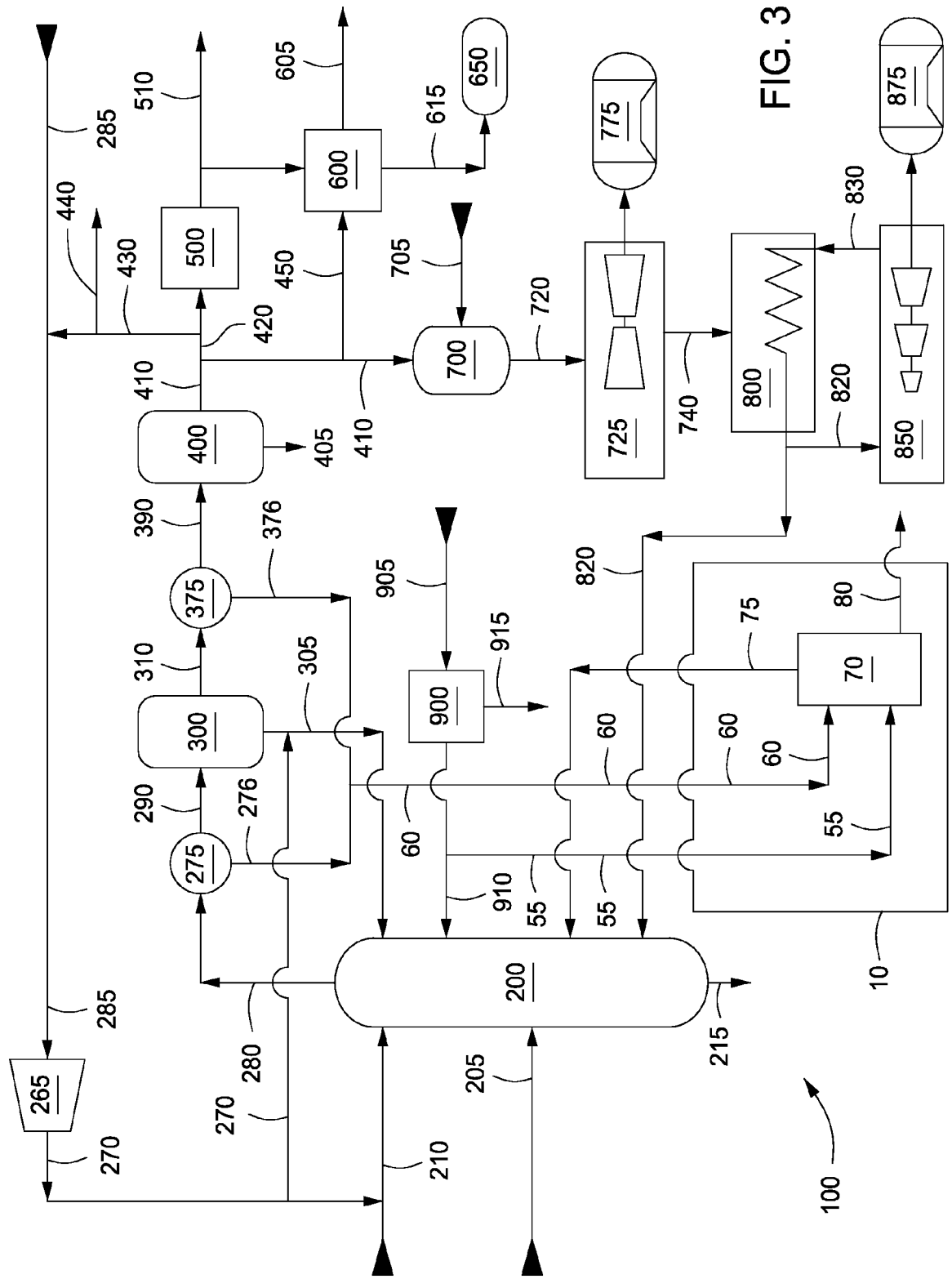
FIG. 3 depicts an illustrative gasification system incorporating the treatment system of FIG. 1, according to one or more embodiments described.

FIG. 3 depicts an illustrative gasification system incorporating the treatment system of FIG. 1, according to one or more embodiments. In one or more embodiments, the gasification system 100 can include one or more water treatment systems 10, gasifiers 200, first stage coolers 275, particulate removal systems 300, second stage coolers 375, and gas purification systems 400 to produce a syngas via line 410. In one or more embodiments, the gasification system can include one or more compressors 265 for compressing and recycling at least a portion of the syngas as a gasifier feed carrier fluid. In one or more embodiments, the gasification system can include one or more gas converters 500 to convert at least a portion of the syngas to one or more products including, but not limited to, Fischer-Tropsch products, methanol, ammonia, hydrogen, carbon monoxide, carbon dioxide, derivatives thereof, and combinations thereof. In one or more embodiments, the gasification system 100 can include one or more hydrogen separators 600, fuel cells 650, combustors 700, gas turbines 725, waste heat boilers 800, steam turbines 850, and generators 775, 875 to produce fuel, power, steam, and/or energy.

The term "carrier fluid," as used herein, can be any fluid or fluid mixture used to fluidize and/or transport the feedstock into the gasifier. Carrier fluids can include, but are not limited to, air, water, steam, syngas, carbon monoxide, carbon dioxide, nitrogen, essentially nitrogen-free gas, low-oxygen gas or liquid, mixtures thereof, and/or combinations thereof. In one or more embodiments, the carrier fluid can be a non-oxidizing gas having a high heating value, for example natural gas and/or recycled syngas.

The term "essentially nitrogen-free" as used herein can be any gas containing less than about 5% vol nitrogen; about 4% vol nitrogen; about 3% vol nitrogen; about 2% vol nitrogen; or about 1% vol nitrogen.

One or more feedstocks via line 210 and one or more oxidants via line 205 can be introduced to one or more gasifiers 200 to provide a raw syngas via line 280. In one or more embodiments, the one or more feedstocks in line 210 can be mixed with one or more carrier gases, introduced via line 270, prior to introduction to the one or more gasifiers 200. In one or more embodiments, the compressed carrier gas 270 can be supplied using one or more compressors 265.

The term "feedstock" and plural "feedstocks" as used herein can refer to one or more carbonaceous (i.e. carbon-based and/or carbon containing) materials, whether solid, liquid, gas, or any combination thereof. Carbonaceous materials can include but are not limited to, biomass (i.e., plant and/or animal matter or plant and/or animal derived matter); coal (including anthracite, bituminous, sub-bituminous and lignite); oil shale; coke; tar; asphaltenes; low ash or no ash polymers; hydrocarbon-based polymeric materials; biomass derived material; or carbonaceous by-products derived from manufacturing operations. The hydrocarbon-based polymeric materials can include, but is not limited to, thermoplastics, elastomers, rubbers, including polypropylenes, polyethylenes, polystyrenes, including other polyolefins, homo polymers, copolymers, block copolymers, and blends thereof, PET (polyethylene terephthalate), poly blends, poly-hydrocarbons containing oxygen; heavy hydrocarbon sludge and bottoms products from petroleum refineries and petrochemical plants such as hydrocarbon waxes, blends thereof, derivatives thereof, and combinations thereof.

In one or more embodiments, the feedstock in line 210 can include a mixture or combination of two or more carbonaceous (i.e. carbon containing) materials. In one or more embodiments, the one or more feedstocks can include discarded consumer products, such as carpet and/or plastic automotive parts/components including bumpers and dashboards suitably reduced in size to fit within the gasifier 200. In one or more embodiments, the feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

In one or more embodiments, the feedstock via line 210 can be conveyed to the gasifier 200 as a slurry or suspension using the one or more carrier fluids supplied via line 270. In one or more embodiments, the feedstock can be dried, for example to 18% moisture, and then pulverized by milling units such as one or more parallel bowl mills prior to feeding to the gasifier 200. In one or more embodiments, the feedstock can be reduced to an average particle diameter size of from about 50 μm to about 500 μm; about 50 μm to about 400 μm; about 150 μm to about 450 μm; or about 250 μm to about 400 μm. The carrier fluid via line 270 can be added to the feedstock in line 210 either before or after reducing the feedstock particle size.

In one or more embodiments, one or more oxygen scavengers and/or sorbents can be added to the feedstock in line 210 to limit the oxygen concentration within the gasifier to levels below the threshold required to support uncontrolled reactions with hydrogen present in the gasifier 200. In one or more embodiments, the oxygen scavenger can include an ash containing reactive carbon which, by reacting to form carbon monoxide and/or carbon dioxide, can chemically bond with residual oxygen present in the gasifier 200. In one or more embodiments, the sorbents can be used to dust or coat the feedstock in line 210 prior to introduction to the gasifier 200 to reduce agglomeration of the feedstock within line 210 and within the gasifier 200. Although not shown in FIG. 1, in one or more embodiments, the one or more sorbents can be added directly to the gasifier 200. In one or more embodiments, the sorbents can be ground to an average particle size of about 5 μm to about 100 μm, or about 10 μm to about 75 μm prior to mixing with the feedstock in line 210. Illustrative sorbents include, but are not limited to, carbon rich ash, limestone, dolomite, and coke breeze. Residual sulfur released from the feedstock can be captured by native calcium in the feed or by a calcium-based sorbent to form calcium sulfide.

In one or more embodiments, the quantity and type of oxidant added to the gasifier via line 205 can determine the composition and physical properties of the syngas and hence, the downstream products made therefrom. The one or more oxidants can include but are not limited to air; oxygen; essentially oxygen; oxygen-enriched air; mixtures of oxygen and air; mixtures of oxygen and inert gas such as nitrogen and argon; and the like. In one or more embodiments, the oxidant can contain about 65% vol oxygen or more, or about 70% vol oxygen or more, or about 75% vol oxygen or more, or about 80% vol oxygen or more, or about 85% vol oxygen or more, or about 90% vol oxygen or more, or about 95% vol oxygen or more, or about 99% vol oxygen or more. As used herein, the term "essentially oxygen" refers to a gas containing 51% vol oxygen or more. As used herein, the term "oxygen-enriched air" refers to a gas containing 21% vol oxygen or more. Oxygen-enriched air can be obtained, for example, from cryogenic distillation of air, pressure swing adsorption, membrane separation or any combination thereof. In one or more embodiments, the gasification system can include one or more air separation units ("ASU") 900 to provide, via line 910, an essentially nitrogen-free source of oxidant to the gasifier 200. The use of an essentially nitrogen-free oxidant within the gasifier 200 can permit the production of an essentially nitrogen-free syngas.

In one or more embodiments, the raw syngas can exit the one or more gasifiers via line 280. In one or more embodiments, the essentially nitrogen-free raw syngas in line 280 can contain 80% vol or more carbon monoxide and hydrogen, 85% vol or more carbon monoxide and hydrogen, 90% vol or more carbon monoxide and hydrogen, or 95% vol or more carbon monoxide and hydrogen. In one or more embodiments, the raw syngas in line 280 can contain 75% vol or more carbon monoxide and hydrogen with the balance being primarily carbon dioxide and methane. In one or more embodiments, the carbon monoxide content of the raw syngas in line 280 can range from a low of about 10% vol, 20% vol, or 30% vol to a high of about 50% vol, 70% vol or 85% vol. In one or more embodiments, the hydrogen content of the raw syngas can range from a low of about 1% vol, 5% vol, or 10% vol to a high of about 30% vol, 40% vol or 50% vol. In one or more embodiments, the hydrogen content of the raw syngas can range from about 20% vol to about 30% vol. In one or more embodiments, the raw syngas in line 280 can contain less than 25% vol; less than 20% vol; less than 15% vol; less than 10% vol; or less than 5% vol, combined nitrogen, methane, carbon dioxide, water, hydrogen sulfide, and hydrogen chloride.

In one or more embodiments, the carbon dioxide concentration in the raw syngas in line 280 can be about 25% vol or less, 20% vol or less, 15% vol or less, 10% vol or less, 5% vol or less, 3% vol or less, 2% vol or less, or 1% vol or less. In one or more embodiments, the methane concentration in the raw syngas in line 280 can be about 15% vol or less, 10% vol or less, 5% vol or less, 3% vol or less, 2% vol or less, or 1% vol or less. In one or more embodiments, the water concentration in the raw syngas in line 280 is about 40% vol or less, 30% vol or less, 25% vol or less, 20% vol or less, 15% vol or less, 10% vol or less, 5% vol or less, 3% vol or less, 2% vol or less, or 1% vol or less. In one or more embodiments, the raw syngas in line 280 can be nitrogen-free or essentially nitrogen-free, e.g. containing less than 0.5% vol nitrogen.

In one or more embodiments, the heating value of the raw syngas in line 280, corrected for heat losses and dilution effects, can range from about 1,860 kJ/m$^3$ (50 Btu/scf) to about 2,800 kJ/m$^3$ (75 Btu/scf); about 1,860 kJ/m$^3$ (50 Btu/scf) to about 3,730 kJ/m$^3$ (100 Btu/scf); about 1,860 kJ/m$^3$ (50 Btu/scf) to about 4,100 kJ/m$^3$ (110 Btu/scf); about 1,860 kJ/m$^3$ (50 Btu/scf) to about 5,200 kJ/m$^3$ (140 Btu/scf); about 1,860 kJ/m$^3$ (50 Btu/scf) to about 6,700 kJ/$^3$ (180 Btu/scf); about 1,860 kJ/m$^3$ (50 Btu/scf) to about 7,450 kJ/m$^3$ (200 Btu/scf); about 1,860 kJ/m$^3$ (50 Btu/scf) to about 9,300 kJ/m$^3$ (250 Btu/scf); or about 1,860 kJ/m$^3$ (50 Btu/scf) to about 10,250 kJ/m$^3$ (275 Btu/scf).

In one or more embodiments, the raw syngas in line 280 can be cooled using the one or more coolers ("first stage coolers") 275 to provide a cooled raw syngas in line 290 and a process condensate ("first condensate") via line 276. In one or more embodiments, the cooled raw syngas in line 290 can exit the first stage cooler at a temperature of about 480° C. (895° F.) or less, 425° C. (795° F.) or less, 370° C. (700° F.) or less, 310° C. (590° F.) or less, 260° C. (500° F.) or less, 200° C. (390° F.) or less, or 140° C. (285° F.) or less.

In one or more embodiments, the first condensate in line 276 can contain one or more thermally destructible contaminants including, but not limited to, ammonia, dissolved hydrocarbons, mixtures thereof, derivatives thereof and/or combinations thereof. In one or more embodiments, the ammonia concentration in the first condensate can range from about 500 ppmw to about 3% wt; about 500 ppmw to about 2% wt; or about 500 ppmw to about 1% wt. In one or more embodiments, the hydrocarbon concentration in the first condensate can range from about 500 ppmw to about 3% wt; about 500 ppmw to about 2% wt; or about 500 ppmw to about 1% wt. In one or more embodiments, the temperature of the first condensate in line 276 can range from about 40° C. (100° F.) to about 260° C. (500° F.); about 90° C. (195° F.) to about 200° C. (390° F.); or about 90° C. (195° F.) to about 150° C. (300° C.). In one or more embodiments, the pressure of the first condensate in line 276 can range from about 150 kPa (10 psig) to about 3,000 kPa (420 psig); about 200 kPa (15 psig) to about 2,000 kPa (275 psig); or about 250 kPa (20 psig) to about 1,000 kPa (130 psig).

The cooled raw syngas in line 290 can be introduced into the one or more particulate removal systems 300. In one or more embodiments, hot gas particulate removal can occur by introducing at least a portion of the raw syngas in line 280 directly to the particulate removal system 300, bypassing the primary cooler 275. In one or more embodiments, when using hot gas particulate removal, the temperature within the particulate removal system 300 can range from about 550° C. (1,020° F.) to about 1,050° C. (1,920° F.).

The one or more particulate removal systems 300 can be used to partially or completely remove solids from the cooled raw syngas in line 290 or, where hot gas particulate removal is employed, from the raw syngas in line 280, to provide separated solids via line 305 and a separated syngas via line 310. In one or more embodiments, the separated solids in line 305 can be recycled to the gasifier 200 or optionally purged from the system (not shown). The one or more particulate removal systems 300 can include one or more separation devices such as conventional disengagers and/or cyclones (not shown). Particulate control devices ("PCD") capable of providing an outlet particulate concentration below the detectable limit of about 0.1 ppmw can also be used. Illustrative PCDs can include, but are not limited to, electrostatic precipitators, sintered metal filters, metal filter candles, and/or ceramic filter candles (for example, iron aluminide filter material).

In one or more embodiments, the separated syngas in line 310 can be cooled using the one or more second stage coolers 375 to provide a cooled, separated, syngas in line 390 and a process condensate ("second condensate") via line 376. Although not shown in FIG. 3, in one or more embodiments, at least a portion of the cooled, separated, syngas in line 390 can be recycled for use as a feedstock carrier gas via line 285. In one or more embodiments, at least a portion of the cooled, separated, syngas in line 390 can be introduced via line 285 to the compressor 265 to provide at least a portion of the carrier fluid via line 270 required to fluidize the incoming feedstock in line 210. In one or more embodiments, the cooled, separated, syngas in line 390 can be cooled to about 370° C. (700° F.) or less, 315° C. (600° F.) or less, 260° C. (500° F.) or less, 200° C. (390° F.) or less, 150° C. (300° F.) or less, 90° C. (195° F.) or less, or 40° C. (100° F.) or less.

In one or more embodiments, the second condensate in line 376 can contain one or more thermally destructible contaminants including, but not limited to, ammonia, dissolved hydrocarbons, mixtures thereof, derivatives thereof and/or combinations thereof. In one or more embodiments, the ammonia concentration in the second condensate can range from about 500 ppmw to about 3% wt; about 500 ppmw to about 2% wt; or about 500 ppmw to about 1% wt. In one or more embodiments, the hydrocarbon concentration in the second condensate can range from about 500 ppmw to about 3% wt; about 500 ppmw to about 2% wt; or about 500 ppmw to about 1% wt. In one or more embodiments, the temperature of the second condensate in line 376 can range from about 40° C. (100° F.) to about 260° C. (500° F.); about 90° C. (195° F.) to about 200° C. (390° F.); or about 90° C. (195° F.) to about 150° C. (300° F.). In one or more embodiments, the pressure of the second condensate in line 376 can range from about 150 kPa (10 psig) to about 3,000 kPa (420 psig); about 200 kPa (15 psig) to about 2,000 kPa (275 psig); or about 250 kPa (20 psig) to about 1,000 kPa (130 psig).

In one or more embodiments, at least a portion of the first condensate in line 276 and at least a portion of the second condensate in line 376 can be combined to form the first effluent in line 60. In one or more embodiments, the first effluent can contain one or more thermally destructible contaminants including, but not limited to, dissolved hydrocarbons, ammonia, and/or other organic compounds. In one or more embodiments, the ammonia concentration in the first effluent in line 60 can be about 500 ppmw to about 3% wt; about 500 ppmw to about 2% wt; or about 500 ppmw to about 1% wt. In one or more embodiments, the hydrocarbon concentration in the first effluent can range from about 500 ppmw to about 3% wt; about 500 ppmw to about 2% wt; or about 500 ppmw to about 1% wt. In one or more embodiments, the temperature of the first effluent in line 60 can range from about 40° C. (100° F.) to about 260° C. (500° F.); about 90° C. (195° F.) to about 200° C. (390° F.); or about 90° C. (195° F.) to about 150° C. (300° F.). In one or more embodiments, the pressure of the first effluent in line 60 can range from about 150 kPa (10 psig) to about 3,000 kPa (420 psig); about 200 kPa (15 psig) to about 2,000 kPa (275 psig); or about 250 kPa (20 psig) to about 1,000 kPa (130 psig).

In one or more embodiments, the first effluent in line 60 and one or more oxidants via line 55 can be introduced to the one or more separators 70 to provide the first recycle via line 75, containing the one or more oxidants and at least a portion of the one or more thermally destructible contaminants, and the third effluent via line 80, containing essentially contaminant-free water. In one or more embodiments, at least a portion of the oxidant supplied via line 55 can be provided by the air separation unit ("ASU") 900.

In one or more embodiments, the first recycle in line 75 can be introduced to the one or more gasifiers 200 to provide at least a portion of the total oxidant demand of the gasifier. In one or more embodiments, the first recycle in line 75 can contain one or more thermally destructible contaminants including, but not limited to ammonia, dissolved hydrocarbons and/or other organics. In one or more embodiments, the ammonia concentration in the first recycle can range from about 500 ppmw to about 3% wt; about 500 ppmw to about 2% wt; or about 500 ppmw to about 1% wt. In one or more embodiments, the hydrocarbon concentration in the first recycle can range from about 500 ppmw to about 3% wt; about 500 ppmw to about 2% wt; or about 500 ppmw to about 1% wt. In one or more embodiments, the temperature of the first recycle in line 75 can range from about 40° C. (100° F.) to about 260° C. (500° F.); about 90° C. (195° F.) to about 200° C. (390° F.); or about 90° C. (195° F.) to about 150° C. (300° F.). In one or more embodiments, the pressure of the first recycle in line 60 can range from about 150 kPa (10 psig) to about 5,000 kPa (710 psig); about 200 kPa (15 psig) to about 2,000 kPa (275 psig); or about 250 kPa (20 psig) to about 1,000 kPa (130 psig).

In one or more embodiments, the third effluent in line 80 can be recycled, reused or directed for additional treatment. In one or more embodiments, the third effluent in line 80 can contain dissolved organic compounds, ammonia and ammonia containing compounds, mixtures thereof, derivatives thereof and/or combinations thereof. In one or more embodiments, the ammonia concentration in the third effluent can range from about 0.1 ppmw to about 50 ppmw; about 0.1 ppmw to about 25 ppmw; or about 0.1 ppmw to about 10 ppmw. In one or more embodiments, the hydrocarbon concentration in the second effluent can range from about 1 ppmw to about 50 ppmw; about 1 ppmw to about 25 ppmw; or about 1 ppmw to about 10 ppmw.

Returning to the second stage cooler 375, in one or more embodiments, at least a portion of the cooled, separated, syngas via line 390 can be introduced to one or more gas purification systems 400. The gas purification system 400 can remove contaminants to provide a waste gas via line 405 and a treated syngas via line 410. The one or more gas purification systems 400 can include systems, processes, or devices to remove contaminants including, but not limited to, sulfur and/or sulfur containing compounds, mercury and/or mercury containing compounds, and carbonyl sulfide from the cooled, separated, syngas in line 390. In one or more embodiments, the gas purification system 400 can be a catalytic purification system, including, but not limited to, one or more systems using zinc titanate, zinc ferrite, tin oxide, zinc oxide, iron oxide, copper oxide, cerium oxide, mixtures thereof, or combinations thereof. In one or more embodiments, gas purification system 400 can be a process-based purification system, including, but not limited to, one or more systems using the Selexol™ process, the Rectisol® process, the Crysta-Sulf® process, and the Sulfinol® Gas Treatment Process, or any combination thereof. In one or more embodiments, the gas purification system 400 can be a combination of one or more catalytic and one or more process-based purification systems.

In one or more embodiments, one or more amine solvents such as methyl-diethanolamine (MDEA) can be used within the gas purification system 400 to remove acid gases from the cooled, separated, syngas via line 390. Physical solvents such as Selexol™ (dimethyl ethers of polyethylene glycol) or Rectisol® (cold methanol), can also be used within the gas purification system 400. If the syngas via line 390 contains carbonyl sulfide (COS), the carbonyl sulfide can be converted by hydrolysis to hydrogen sulfide by reaction with water over a catalyst and then absorbed using one or more of the methods described above. If the cooled, separated, syngas in line 390 contains one or more heavy metals, for example mercury and/or cadmium, a bed of sulfur-impregnated activated carbon, active metal sorbents, such as iridium, palladium, ruthenium, platinum, alloys thereof, combinations thereof, or any other known heavy metal removal technology can be used to remove the one or more heavy metals.

In one or more embodiments, a cobalt-molybdenum ("Co—Mo") catalyst can be incorporated into the one or more gas purification systems 400 to perform a sour shift conversion of the cooled, separated, syngas in line 390. (i.e. the conversion of carbon monoxide to carbon dioxide in the presence of hydrogen sulfide) The Co—Mo catalyst can operate at a temperature of about 290° C. (550° F.) in the presence of hydrogen sulfide ($H_2S$), such as about 100 ppmw $H_2S$. If a Co—Mo catalyst is used to perform a sour shift within the gas purification system 400, subsequent downstream removal of sulfur and/or sulfur-containing compounds from the shifted syngas can be accomplished using any of the above described sulfur removal methods and/or techniques.

In one or more embodiments, at least a portion of the treated syngas in line 410 can be directed via line 430 to line 285 for recycle as a carrier gas. In one or more embodiments, at least a portion of the treated syngas in line 430 can be removed via line 440 and sold as a commodity. In one or more embodiments, at least a portion of the treated syngas in line 410 can be introduced via line 420 to a gas converter 500 to produce one or more products including, but not limited to, Fischer-Tropsch products, methanol, ammonia, feedstocks, derivatives thereof, or combinations thereof. In one or more embodiments, at least a portion of the treated syngas via line 410 can be introduced to one or more hydrogen separators 600 via line 450 to provide a hydrogen-rich gas via line 615. In one or more embodiments, at least a portion of the treated syngas in line 410 can be combusted to produce or generate mechanical power, electrical power and/or steam.

In one or more embodiments, at least a portion of the treated syngas in line 410 can be recycled via line 430 for use as a carrier gas via line 285. The carrier gas in line 285 can be introduced to one or more compressors 265 and compressed to provide a compressed carrier gas via line 270. In one or more embodiments, at least a portion of the compressed carrier gas in line 270 can be used to fluidize the feedstock in line 210. In one or more embodiments, at least a portion of the compressed carrier gas in line 270 can be used to fluidize and transport the separated solids via line 305 to the gasifier 200. In one or more embodiments, the compressed carrier gas 270 can be introduced at an elevated temperature to the feedstock in line 210 to improve heat utilization, and lessen fuel consumption in the gasifier 200. In one or more embodiments, the use of an oxidant-lean carrier gas, such as the treated syngas supplied via line 430, can minimize undesirable oxidizing reactions between the feedstock and the carrier gas after the two are combined in line 210. In one or more embodiments, the use of an oxidant-lean carrier gas supplied via line 270 can minimize dust explosion hazards in the feedstock in line 210, for example when the feedstock contains pulverized coal.

In one or more embodiments, at least a portion of the carrier gas via line 285 can be supplied from an external source, i.e. not from the syngas being produced in the gasification process 100. In one or more embodiments, at least a portion of the carrier gas in line 285 can be one or more high temperature, oxidant-lean, gases having a heating value, such as methane, ethane, propane, butane, hydrogen, syngas and the like. In one or more embodiments, at least a portion of the carrier gas in line 285 can include: steam, carbon monoxide, nitrogen, essentially nitrogen-free gas, low-oxygen gas, low-oxygen gas with a heating value, or any combination thereof. Although not shown in FIG. 3, in one or more specific embodiments, nitrogen from the ASU 900 can be supplied to make-up at least a portion of the carrier gas in line 285. Controlling the relative volumes of nitrogen and syngas within the recycle gas 285 can provide a compressed carrier gas via line 270 with a known heating value range. Such controls can be advantageous in controlling the thermal profile and performance of the gasifier 200.

The term "low-oxygen" as used herein can be any gas containing less than about 10% vol oxygen; about 5% vol oxygen; about 3% vol oxygen; about 2% vol oxygen; or about 1% vol oxygen.

In one or more embodiments, the compressed carrier gas in line 270 can include less than about 25% vol oxygen, or less than about 10% vol oxygen; less than about 5% vol oxygen; less than about 2.5% vol oxygen; less than about 1% vol oxygen; or less than about 0.5% vol oxygen. In one or more embodiments, the compressed carrier gas can be at a temperature of from about 200° C. (400° F.) to about 1,100° C. (2,010° F.). In one or more embodiments, the compressed carrier gas can be at a temperature of from about 300° C. (570° F.) or more, or about 500° C. (930° F.) or more, or about 700° C. (1,290° F.) or more, or about 900° C. (1,650° F.) or more. In one or more embodiments, the compressed carrier gas can be at a pressure of from about 200 kPa (15 psig) to about 4,600 kPa (665 psig). In one or more embodiments, the compressed carrier gas can be at pressures from about 790 kPa (115 psig) to about 3,800 kPa (550 psig). In one or more embodiments, the compressed carrier gas can be at a pressure of from about 790 kPa (115 psig) to about 3,100 kPa (450 psig). In one or more embodiments, the compressed carrier gas can be at a pressure of from about 790 kPa (115 psig) to about 2,400 kPa (350 psig). In one or more embodiments, the compressed carrier gas via line 270 can have a heating value, corrected for heat losses and dilution effects, of about 1,860 kJ/m$^3$ (50 Btu/scf) to about 2,800 kJ/m$^3$ (75 Btu/scf); about 1,860 kJ/m$^3$ (50 Btu/scf) to about 3,730 kJ/m$^3$ (100 Btu/scf); about 1,860 kJ/m$^3$ (50 Btu/scf) to about 4,100 kJ/m$^3$ (110 Btu/scf); about 1,860 kJ/m$^3$ (50 Btu/scf) to about 5,200 kJ/m$^3$ (140 Btu/scf); about 1,860 kJ/m$^3$ (50 Btu/scf) to about 6,700 kJ/$^3$ (180 Btu/scf); about 1,860 kJ/m$^3$ (50 Btu/scf) to about 7,450 kJ/m$^3$ (200 Btu/scf); about 1,860 kJ/m$^3$ (50 Btu/scf) to about 9,300 kJ/m$^3$ (250 Btu/scf); or about 1,860 kJ/m$^3$ (50 Btu/scf) to about 10,250 kJ/m$^3$ (275 Btu/scf).

In one or more embodiments, at least a portion of the treated syngas via line 410 can be introduced via line 420 to a gas converter 500 to produce one or more products via line 510 including, but not limited to, carbon dioxide, Fischer-Tropsch products, methanol, ammonia, feedstocks, derivatives thereof, or combinations thereof. The one or more gas converters 500 can include one or more shift reactors to adjust the hydrogen ($H_2$) to carbon monoxide (CO) ratio ($H_2$:CO) of the synthesis gas by converting at least a portion of the carbon monoxide present in the treated syngas in line 420 to carbon dioxide via a water-gas shift reaction.

In one or more embodiments, the one or more shift reactors within the gas converter 500 can include, but are not limited to, single stage adiabatic fixed bed reactors; multiple-stage adiabatic fixed bed reactors with or without interstage cooling; steam generation or cold quench reactors; tubular fixed bed reactors with steam generation or cooling; fluidized bed reactors; or any combination thereof to provide one or more products via line 510 containing converted syngas. In one or more embodiments, a sorption enhanced water-gas shift (SEWGS) process, utilizing a pressure swing adsorption unit having multiple fixed bed reactors packed with shift catalyst and operated at a high temperature of approximately 475° C. (890° F.) can be used.

In at least one specific embodiment, the one or more gas converters 500 can include two shift reactors arranged in series. A first reactor can be operated at high temperature of from about 300° C. (570° F.) to about 450° C. (840° F.) to convert a majority of the carbon monoxide present in the treated syngas via line 420 to carbon dioxide at a relatively high reaction rate using an iron-chrome catalyst. A second reactor can be operated at a relatively low temperature of from about 150° C. (300° F.) to about 225° C. (440° F.) to further convert remaining carbon monoxide to carbon dioxide using a mixture of copper oxide and zinc oxide. In one or more embodiments, a medium temperature shift reactor can be used in addition to, in place of, or in combination with, the high temperature shift reactor and/or low temperature shift reactor. The medium temperature shift reactor can be operated at a temperature of from about 250° C. (480° F.) to about 300° C. (570° F.). The one or more high, medium, and/or low temperature shift reactors within the gas converter 500 can convert at least a portion of the carbon monoxide present in the treated syngas via line 420 to carbon dioxide at a relatively high rate using a shift catalyst containing iron oxide, chromium oxide, mixtures thereof, derivatives thereof, or any combination thereof.

Although not depicted in FIG. 3, any carbon dioxide present in the syngas in line 510 can be separated, adsorbed and/or recovered. Suitable carbon dioxide adsorbents and absorption techniques include, but are not limited to, propylene carbonate physical adsorbent; alkyl carbonates; dimethyl ethers of polyethylene glycol of two to twelve glycol units (Selexol™ process); n-methyl-pyrrolidone; sulfolane; and/or use of the Sulfinol® Gas Treatment Process. In one or more embodiments, carbon dioxide recovered from the syngas in line 510 can be used to enhance the wellhead production and recovery of crude oil and gas. In an illustrative hydrocarbon production process, carbon dioxide recovered from the syngas in line 510 can be injected into, and flushed through, an area beneath an existing hydrocarbon production well where one or more "stranded" hydrocarbon deposits exist.

In one or more embodiments, one of the one or more gas converters 500 can produce one or more Fischer-Tropsch ("F-T") products, including refinery/petrochemical feedstocks, transportation fuels, synthetic crude oil, liquid fuels, lubricants, alpha olefins, waxes, and the like. The F-T reaction can be carried out in any type reactor, for example, through the use of fixed beds; moving beds; fluidized beds; slurries; bubbling beds, or any combination thereof. The F-T reaction can employ one or more catalysts including, but not limited to, copper-based; ruthenium-based; iron-based; cobalt-based; mixtures thereof, or any combination thereof. The F-T reaction can be carried out at temperatures ranging from about 190° C. (375° F.) to about 450° C. (840° F.) depending on the reactor configuration. Additional reaction and catalyst details can be found in U.S. 2005/0284797 and U.S. Pat. Nos. 5,621,155; 6,682,711; 6,331,575; 6,313,062; 6,284,807; 6,136,868; 4,568,663; 4,663,305; 5,348,982; 6,319,960; 6,124,367; 6,087,405; 5,945,459; 4,992,406; 6,117,814; 5,545,674, and 6,300,268.

Fischer-Tropsch products produced within the gas converter 500 can include, but are not limited to, liquids which can be further reacted and/or upgraded to a variety of finished hydrocarbon products. Certain products, e.g. $C_4$-$C_5$ hydrocarbons, can include high quality paraffin solvents which, if desired, can be hydrotreated to remove olefinic impurities, or employed without hydrotreating to produce a wide variety of wax products. Liquid hydrocarbon products, containing $C_{16}$ and higher hydrocarbons can be upgraded by various hydroconversion reactions, for example, hydrocracking, hydroisomerization, catalytic dewaxing, isodewaxing, or combinations thereof. The converted $C_{16}$ and higher hydrocarbons can be used in the production of mid-distillates, diesel fuel, jet fuel, isoparaffinic solvents, lubricants, drilling oils suitable for use in drilling muds, technical and medicinal grade white oil, chemical raw materials, and various hydrocarbon specialty products.

In at least one specific embodiment, at least one of the one or more gas converters 500 can include one or more Fischer-Tropsch slurry bubble column reactors. In one or more embodiments, the catalyst within the slurry bubble column reactors can include, but is not limited to, a titania support impregnated with a salt of a catalytic copper or an Iron Group metal, a polyol or polyhydric alcohol and, optionally, a rhenium compound or salt. Examples of polyols or polyhydric alcohols include glycol, glycerol, derythritol, threitol, ribitol arabinitol, xylitol, allitol, dulcitol, gluciotol, sorbitol, and mannitol. In one or more embodiments, the slurry bubble column reactors can operate at a temperature of less than 220° C. (430° F.) and from about 100 kPa (15 psi) to about 4,140 kPa (600 psi), or about 1,720 kPa (250 psi) to about 2,410 kPa (350 psi) using a cobalt (Co) catalyst promoted with rhenium (Re) and supported on titania having a Re:Co weight ratio in the range of about 0.01 to about 1 and containing from about 2% wt to about 50% wt cobalt.

In one or more embodiments, the one or more Fischer-Tropsch slurry bubble column reactors within the gas converter 500 can use a catalytic metal, copper or iron group metal within a concentrated aqueous salt solution, for example cobalt nitrate or cobalt acetate. The resultant aqueous salt solution can be combined with one or more polyols, or optionally perrhenic acid, while adjusting the amount of water to obtain approximately 15 wt % cobalt in the solution. Incipient wetness techniques can be used to impregnate the catalyst onto a rutile or anatase titania support, optionally spray-dried, and calcined. This method reduces the need for rhenium promoter within the F-T reactor. Additional details can be found in U.S. Pat. Nos. 5,075,269 and 6,331,575.

In one or more embodiments, the one or more gas converters 500 can produce ammonia, using the Haber-Bosch process described in LeBlanc et al in "Ammonia," Kirk-Othmer Encyclopedia of Chemical Technology, Volume 2, 3rd Edition, 1978, pp., 494-500. In one or more embodiments, the one or more gas converters 500 can be used for the production of alkyl-formates, for example, the production of methyl formate. Any of several alkyl-formate production processes can be used within the gas converter 500, for example a gas or liquid phase reaction between carbon monoxide and methanol occurring in the presence of an alkaline, or alkaline earth metal methoxide catalyst. Additional details can be found in U.S. Pat. Nos. 3,716,619; 3,816,513; and 4,216,339.

In one or more embodiments, at least one of the one or more gas converters 500 can be used to produce methanol, dimethyl ether, ammonia, acetic anhydride, acetic acid, methyl acetate, acetate esters, vinyl acetate and polymers, ketenes, formaldehyde, dimethyl ether, olefins, derivatives thereof, or combinations thereof. For methanol production, for example, the Liquid Phase Methanol Process can be used (LPMEOH™). In this process, at least a portion of the carbon monoxide in the syngas via line 420 can be directly converted into methanol using a slurry bubble column reactor and catalyst in an inert hydrocarbon oil reaction medium. The inert hydrocarbon oil reaction medium can conserve heat of reaction while idling during off-peak periods for a substantial amount of time while maintaining good catalyst activity. Additional details can be found in U.S. 2006/0149423 and prior published Heydorn, E. C., Street, B. T., and Kornosky, R. M., "Liquid Phase Methanol (LPMEOH™) Project Operational Experience," (Presented at the Gasification Technology Council Meeting in San Francisco on Oct. 4-7, 1998). Gas phase processes for producing methanol can also be used. For example, known processes using copper based catalysts, the Imperial Chemical Industries process, the Lurgi process and the Mitsubishi process can be used.

In one or more embodiments, at least a portion of the carbon monoxide in the treated syngas in line 420 can be separated in gas converter 500 and recovered as a carbon monoxide-rich gas (not shown). Recovered carbon monoxide can be used in the production of one or more commodity and/or specialty chemicals, including, but not limited to, acetic acid, phosgene, isocyanates, formic acid, propionic acid, mixtures thereof, derivatives thereof, and/or combinations thereof. Although not depicted in FIG. 1, in one or more embodiments, the carbon monoxide-rich gas from the gas converter 500 can be used to provide at least a portion of the carrier gas in line 285.

In one or more embodiments, at least a portion of the treated syngas via line 410 can be introduced to one or more hydrogen separators 600 via line 450 to provide a hydrogen-rich gas via line 615. In one or more embodiments, at least a portion of the product in line 510, containing converted syngas, can also be directed to the one or more hydrogen separators 600 to provide a hydrogen-rich gas via line 615. In one or more embodiments, the one or more hydrogen separators 600 can include any system or device to selectively separate hydrogen from a gas mixture to provide purified hydrogen via line 615 and one or more waste gases via line 605. In one or more embodiments, the hydrogen separators 600 can utilize one or more gas separation technologies including, but not limited to, pressure swing absorption, cryogenic distillation, semi-permeable membranes, or any combination thereof. Suitable absorbents can include caustic soda, potassium carbonate or other inorganic bases, and/or alanolamines.

In one or more embodiments, the hydrogen separators 600 can provide a carbon dioxide-rich waste gas via line 605, and a hydrogen-rich product via line 615. In one or more embodiments, at least a portion of the hydrogen-rich product via line 615 can be used as a feedstock to one or more fuel cells 650. In one or more embodiments, at least a portion of the hydrogen-rich product via line 615 can be combined with the treated syngas via line 410 prior for use as a fuel in the one or more combustors 700. While not depicted in FIG. 1, in one or more embodiments, at least a portion of the hydrogen-rich product via line 615 can be recycled to line 285 to provide at least a portion of the carrier fluid. In one or more embodiments, the hydrogen-rich product in line 615 can be used in one or more downstream operations, including, but not limited to, hydrogenation processes, fuel cell energy processes, ammonia production, and/or hydrogen fuel. For example, the hydrogen-rich product in line 615 can be used to make hydrogen fuel using one or more hydrogen fuel cells 650.

In one or more embodiments, at least a portion of the treated syngas in line 410 can be combined with one or more oxidants introduced via line 705 and combusted in one or more combustors 700 to provide a high pressure/high temperature exhaust gas via line 720. The exhaust gas in line 720 can be passed through one or more turbines 725 and/or heat recovery devices 800 to provide mechanical power, electrical power and/or steam. In one or more embodiments, the exhaust gas via line 720 can be introduced to one or more gas turbines 725 to provide an exhaust gas via line 740 and mechanical shaft power to drive the one or more electric generators 775. In one or more embodiments, the exhaust gas via line 740 can be introduced to one or more heat recovery systems 800 to provide steam via line 820. In one or more embodiments, a first portion of the steam via line 820 can be introduced to one or more steam turbines 850 to provide mechanical shaft power to drive one or more electric generators 875. In one or more embodiments, a second portion of the steam via line 820 can be introduced to the gasifier 200, and/or other auxiliary process equipment. In one or more embodiments, lower pressure steam from the one or more steam turbines 850 can be recycled to the one or more heat recovery systems 800 via line 830. In one or more embodiments, residual heat from line 820 can be rejected to a condensation system well known to those skilled in the art or sold to local industrial and/or commercial steam consumers.

In one or more embodiments, the heat recovery system 800 can be a closed-loop heating system, e.g. a waste heat boiler, shell-tube heat exchanger, and the like, capable of exchanging heat between the exhaust gas in line 740 and the lower pressure steam via line 830 to produce steam via line 820. In one or more embodiments, the heat recovery system 800 can provide up to 10,350 kPa (1,500 psi), 600° C. (1,000° F.) superheat/reheat steam without supplemental fuel.

In one or more embodiments, one or more air separation units 900 can be used to provide oxygen and/or oxygen-enriched air to the gasifier 200 via line 910. In one or more embodiments, air via line 905 can be supplied to the ASU 900. In one or more embodiments, the ASU 900 can provide a nearly-pure oxygen feed via line 910 to the one or more gasifiers 200, thereby minimizing the quantity of nitrogen introduced to the gasifier 200 and permitting the production of an essentially nitrogen-free raw syngas in line 280. In one or more embodiments, up to than 10% of the total oxidant fed to the gasifier can be supplied by the ASU 900 via line 910. In one or more embodiments, the oxygen supplied by the ASU 900 via line 910 can provide about 10%, about 20%, about 30%, about 40%, or about 50% of the total oxidant fed to the gasifier 200. In one or more embodiments, the ASU 900 can be a high-pressure, cryogenic type separator. The nitrogen-rich reject gas via line 915 can be vented, sold as a commodity, added to a combustion turbine, and/or used as utility.

The term "nearly-pure oxygen" as used herein can be any gas containing a minimum of about 90% vol oxygen, about 95% vol oxygen, about 97.5% vol oxygen, about 99% vol oxygen, or about 99.9% vol oxygen.

Figure 4:
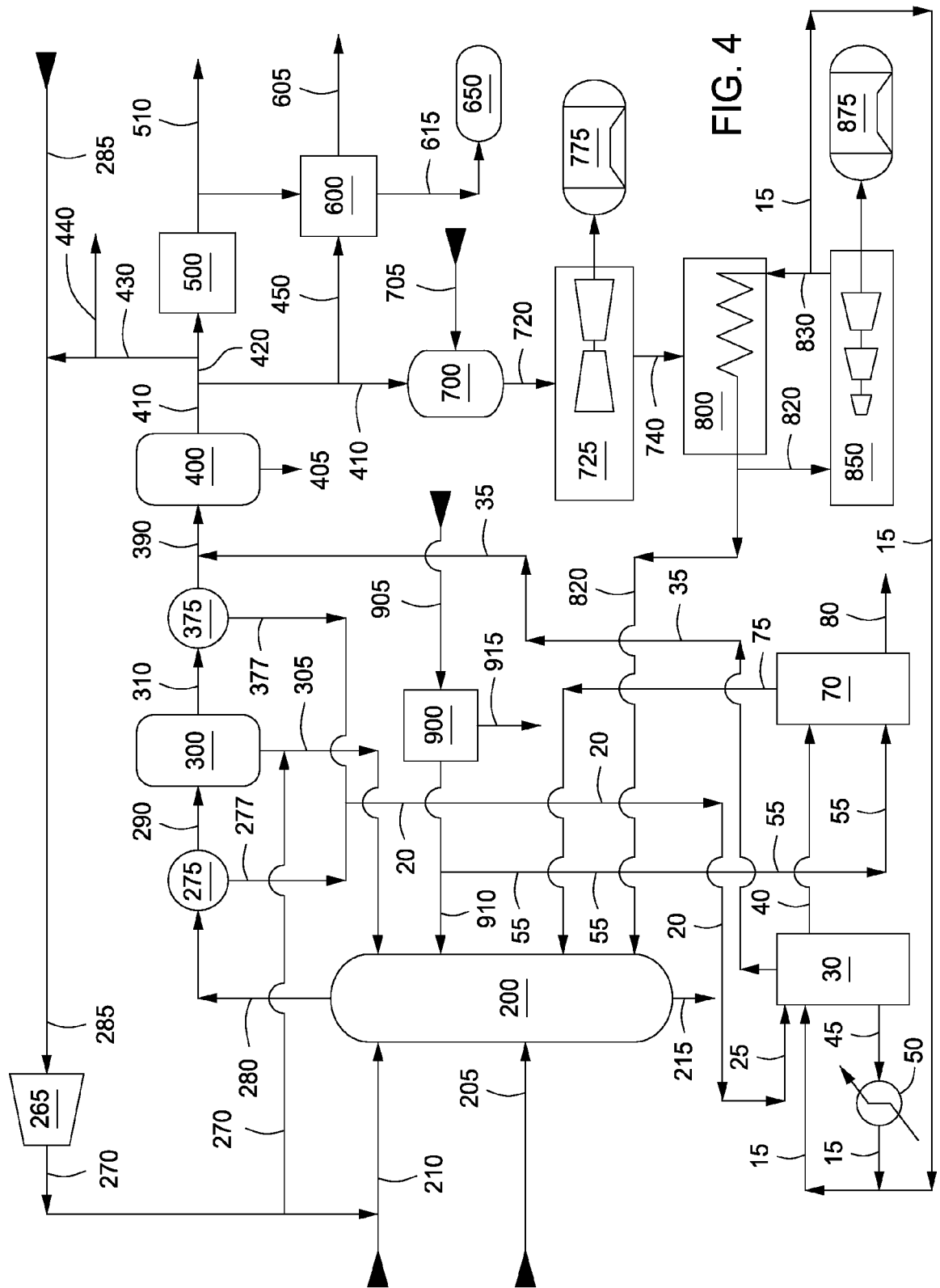
FIG. 4 depicts another illustrative gasification system incorporating the treatment system of FIG. 2, according to one or more embodiments described.

FIG. 4 depicts another illustrative gasification system incorporating the treatment system of FIG. 2, according to one or more embodiments. FIG. 4 depicts a similar installation to FIG. 3, using a water treatment system 10 removing both thermally destructible and thermally indestructible contaminants as described in detail with reference to FIG. 2.

In one or more embodiments, the first condensate can be removed from the first stage cooler 275 via line 277. In one or more embodiments, the first condensate in line 277 can contain both thermally destructible and thermally indestructible contaminants including, but not limited to, hydrogen sulfide, hydrogen chloride, carbonyl sulfide, ammonia, dissolved hydrocarbons, mixtures thereof, derivatives thereof and/or combinations thereof. In one or more embodiments, the hydrogen sulfide concentration in the first condensate can range from about 500 ppmw to about 3% wt; about 500 ppmw to about 2% wt; or about 500 ppmw to about 1% wt. In one or more embodiments, the hydrogen chloride concentration in the first condensate can range from about 500 ppmw to about 3% wt; about 500 ppmw to about 2% wt; or about 500 ppmw to about 1% wt. %. In one or more embodiments, the carbonyl sulfide concentration in the first condensate can range from about 500 ppmw to about 3% wt; about 500 ppmw to about 2% wt; or about 500 ppmw to about 1% wt. In one or more embodiments, the ammonia concentration in the first condensate can range from about 500 ppmw to about 3% wt; about 500 ppmw to about 2% wt; or about 500 ppmw to about 1% wt. In one or more embodiments, the hydrocarbon concentration in the first condensate can range from about 500 ppmw to about 3% wt; about 500 ppmw to about 2% wt; or about 500 ppmw to about 1% wt. In one or more embodiments, the temperature of the first condensate in line 277 can range from about 40° C. (105° F.) to about 260° C. (500° F.); about 90° C. (195° F.) to about 200° C. (390° F.); or about 90° C. (195° F.) to about 150° C. (300° F.). In one or more embodiments, the pressure of the first condensate in line 277 can range from about 100 kPa (0 psig) to about 5,000 kPa (710 psig); about 100 kPa (0 psig) to about 2,000 kPa (275 psig); or about 100 kPa (0 psig) to about 1,000 kPa (130 psig).

In one or more embodiments, the second condensate can be removed from the second stage cooler 375 via line 377. In one or more embodiments, the second condensate via line 377 can contain both thermally destructible and thermally indestructible contaminants including, but not limited to, hydrogen sulfide, hydrogen chloride, carbonyl sulfide, ammonia, dissolved hydrocarbons, mixtures thereof, derivatives thereof and/or combinations thereof. In one or more embodiments, the hydrogen sulfide concentration in the second condensate can range from about 500 ppmw to about 3% wt; about 500 ppmw to about 2% wt; or about 500 ppmw to about 1% wt. In one or more embodiments, the hydrogen chloride concentration in the second condensate can range from about 500 ppmw to about 3% wt; about 500 ppmw to about 2% wt; or about 500 ppmw to about 1% wt. In one or more embodiments, the carbonyl sulfide concentration in the second condensate can range from about 500 ppmw to about 3% wt; about 500 ppmw to about 2% wt; or about 500 ppmw to about 1% wt. In one or more embodiments, the ammonia concentration in the second condensate can range from about 500 ppmw to about 3% wt; about 500 ppmw to about 2% wt; or about 500 ppmw to about 1% wt. In one or more embodiments, the hydrocarbon concentration in the second condensate can range from about 500 ppmw to about 3% wt; about 500 ppmw to about 2% wt; or about 500 ppmw to about 1% wt. In one or more embodiments, the temperature of the second condensate in line 377 can range from about 40° C. (105° F.) to about 260° C. (500° F.); about 90° C. (195° F.) to about 200° C. (390° F.); or about 90° C. (195° F.) to about 150° C. (300° F.). In one or more embodiments, the pressure of the second condensate in line 377 can range from about 100 kPa (0 psig) to about 5,000 kPa (710 psig); about 100 kPa (0 psig) to about 2,000 kPa (275 psig); or about 100 kPa (0 psig) to about 1,000 kPa (130 psig).

In one or more embodiments, at least a portion of the first condensate in line 277 and at least the portion of a second condensate in line 377 can be combined to form the second effluent in line 20. In one or more embodiments, the second effluent in line 20 can contain one or more thermally indestructible contaminants including, but not limited to, hydrogen sulfide, carbonyl sulfide and/or hydrogen chloride, as well as one or more thermally destructible contaminants including, but not limited to, ammonia, dissolved hydrocarbons, and/or dissolved organic compounds. In one or more embodiments, the hydrogen sulfide concentration in the second effluent can range from about 500 ppmw to about 3% wt; about 500 ppmw to about 2% wt; or about 500 ppmw to about 1% wt. In one or more embodiments, the hydrogen chloride concentration in the second effluent can range from about 500 ppmw to about 3% wt; about 500 ppmw to about 2% wt; or about 500 ppmw to about 1% wt. In one or more embodiments, the ammonia concentration in the second effluent can range from about 500 ppmw to about 3% wt; about 500 ppmw to about 2% wt; or about 500 ppmw to about 1% wt. In one or more embodiments, the hydrocarbon concentration in the second effluent can range from about 500 ppmw to about 3% wt; about 500 ppmw to about 2% wt; or about 500 ppmw to about 1% wt. In one or more embodiments, the temperature of the second effluent in line 20 can range from about 125° C. (260° F.) to about 185° C. (365° F.), about 135° C. (275° F.) to about 185° C. (365° F.), or about 150° C. (300° F.) to about 170° C. (340° F.). In one or more embodiments, the pressure of the second effluent in line 20 can range from about 150 kPa (10 psig) to about 1,500 kPa (200 psig), about 200 kPa (15 psig) to about 1,000 kPa (130 psig), or about 400 kPa (45 psig) to about 800 kPa (100 psig).

In one or more embodiments, the second effluent via line 20 and the steam in line 15, can be introduced to the one or more separators 30 to provide the second intermediate via line 40 containing water and one or more thermally destructible contaminants, and the second recycle via line 35 containing steam and one or more non-thermally destructible contaminants. In one or more embodiments, the steam supply-to-second effluent weight ratio can range from about 1:1 to about 20:1; from about 2:1 to about 15:1; or from about 5:1 to about 10:1.

In one or more embodiments, at least a portion of the lower pressure steam in line 830 can be used to provide at least a portion of the steam in line 15. In one or more embodiments, the reboiler 50 can be used to generate at least a portion of the steam in line 15 using water drafted via line 45 from the separator 30. In one or more embodiments, the steam supply can be at a pressure of about 150 kPa (10 psig) to about 1,500 kPa (200 psig), about 200 kPa (15 psig) to about 1,000 kPa (130 psig), or about 400 kPa (45 psig) to about 800 kPa (100 psig). In one or more embodiments, the reboiler 50 can operate at a temperature from about 125° C. (260° F.) to about 185° C. (365° F.), about 135° C. (275° F.) to about 185° C. (365° F.), or about 150° C. (300° F.) to about 170° C. (340° F.).

In one or more embodiments, the second recycle in line 35, containing steam and at least a portion of the one or more thermally indestructible contaminants, can be mixed with the cooled, separated, syngas in line 390 prior to introducing the mixture to the one or more gas purifiers 400. Although not shown in FIG. 4, in one or more embodiments, the second recycle in line 35 can be recycled directly to the one or more gas purifiers 400.

In one or more embodiments, the second recycle in line 35 can contain at least a portion of the one or more thermally indestructible dissolved organic compounds, including, but not limited to, hydrogen sulfide, hydrogen chloride, mixtures thereof, derivatives thereof and/or combinations thereof. In one or more embodiments, the hydrogen sulfide concentration in the second recycle can range from about 500 ppm to about 3% wt; about 500 ppm to about 2% wt; or about 500 ppm to about 1% wt. In one or more embodiments, the hydrogen chloride concentration in the second recycle can range from about 500 ppm to about 3% wt; about 500 ppm to about 2% wt; or about 500 ppm to about 1% wt. In one or more embodiments, the hydrocarbon concentration in the second recycle can range from about 500 ppm to about 3% wt; about 500 ppm to about 2% wt; or about 500 ppm to about 1% wt. In one or more embodiments, the temperature of the second recycle in line 35 can range from about 180° C. (355° F.) to about 230° C. (445° F.); about 180° C. (355° F.) to about 210° C. (410° F.); or about 180° C. (355° F.) to about 190° C. (375° F.). In one or more embodiments, the second recycle pressure can be about 500 kPa (60 psig) to about 3,000 kPa (420 psig); about 500 kPa (60 psig) to about 2,000 kPa (275 psig); or about 500 kPa (60 psig) to about 1,500 kPa (200 psig).

In one or more embodiments, the second intermediate in line 40 and one or more oxidants via line 55 can be introduced to the one or more separators 70 to provide the third effluent via line 80 containing essentially contaminant-free water and the first recycle via line 75 containing the one or more oxidants and at least a portion of the one or more thermally destructible contaminants. In one or more embodiments, at least a portion of the one or more oxidants in line 55 can be supplied using the ASU 900. In one or more embodiments, a nearly-pure oxygen stream can be used to provide the one or more oxidants via line 55. In one or more embodiments, the concentration of the one or more oxidants in the second intermediate within the separator 30 can range from about 0.1% wt to about 10% wt, about 0.25% wt to about 5% wt, or about 0.5% wt to about 2.5% wt.

In one or more embodiments, the first recycle in line 75 can be introduced to the one or more gasifiers 200 to provide at least a portion of the oxidant requirement to the gasifier 200. In one or more embodiments, the first recycle in line 75 can contain dissolved organic compounds, ammonia and ammonia containing compounds, mixtures thereof, derivatives thereof and/or combinations thereof. In one or more embodiments, the ammonia concentration in the first recycle can range from about 500 ppmw to about 3% wt; about 500 ppmw to about 2% wt; or about 500 ppmw to about 1% wt. In one or more embodiments, the hydrocarbon concentration in the first recycle can range from about 500 ppmw to about 3% wt; about 500 ppmw to about 2% wt; or about 500 ppmw to about 1% wt. In one or more embodiments, the temperature of the first recycle temperature in line 75 can range from about 50° C. (120° F.) to about 200° C. (390° F.), about 50° C. (120° F.)

to about 150° C. (300° F.), or about 50° C. (120° F.) to about 125° C. (260° F.). In one or more embodiments, the pressure of the first recycle in line 75 can range from about 200 kPa (15 psig) to about 1,500 kPa (200 psig), about 200 kPa (15 psig) to about 1,250 kPa (165 psig), or about 200 kPa (15 psig) to about 1,000 kPa (130 psig).

Although not shown in FIG. 4, in one or more embodiments, the third effluent in line 80 can be recycled, reused or directed for additional treatment. In one or more embodiments, the third effluent in line 80 can contain low-levels of dissolved organic compounds, ammonia and ammonia containing compounds, mixtures thereof, derivatives thereof and/or combinations thereof. In one or more embodiments, the ammonia concentration in the third effluent can range from about 0.1 ppmw to about 50 ppmw, about 0.1 ppmw to about 25 ppmw, or about 0.1 ppmw to about 10 ppmw. In one or more embodiments, the hydrocarbon concentration in the third effluent can range from about 1 ppmw to about 50 ppmw, about 1 ppmw to about 25 ppmw, or about 1 ppmw to about 10 ppmw. In one or more embodiments, the temperature of the third effluent in line 80 can range from about 25° C. (75° F.) to about 95° C. (200° F.), about 25° C. (75° F.) to about 65° C. (150° F.), or about 25° C. (75° F.) to about 60° C. (140° F.). In one or more embodiments, the third effluent pressure can be about 200 kPa (15 psig) to about 1,500 kPa (200 psig), about 200 kPa (15 psig) to about 1,250 kPa (165 psig); or about 200 kPa (15 psig) to about 1,000 kPa (130 psig).

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for treating water, comprising:
   contacting a first effluent comprising water, one or more thermally destructible contaminants, and one or more thermally indestructible contaminants with steam, to provide a second effluent comprising the steam and at least a portion of the one or more thermally indestructible contaminants and an intermediate comprising the water and at least a portion of the one or more thermally destructible contaminants;
   treating the second effluent within an acid recovery unit;
   contacting the intermediate with one or more oxidants to provide a third effluent comprising the one or more oxidants and at least a portion of the one or more thermally destructible contaminants and a fourth effluent comprising water; and
   destructing the thermally destructible contaminants present in the third effluent using one or more combustion processes.

2. The method of claim 1, wherein the combustion process is a hydrocarbon gasification process.

3. The method of claim 1, wherein the one or more oxidants comprise air, oxygen, oxygen-enriched air, or any combination thereof.

4. The method of claim 1, wherein the pressure of the steam ranges from about 200 kPa to about 1,130 kPa.

5. The method of claim 2, wherein the acid recovery unit is an acid gas unit within a hydrocarbon gasification process.

6. The method of claim 1, wherein the first effluent comprises a mixture of contact and non-contact cooling water.

7. The method of claim 1, wherein a weight ratio of the steam-to-first effluent ranges from about 1:1 to about 20:1.

8. The method of claim 1, wherein the concentration of the one or more oxidants in the intermediate is about 0.1% wt to about 5.0% wt.

9. The method of claim 1, further comprising:
   gasifying a feedstock comprising a polymer and coal to produce a raw syngas comprising the one or more thermally destructible contaminants, wherein the polymer comprises polyethylene, polypropylene, polystyrene, polyethylene terephthalate (PET), or any combination thereof, and
   cooling the raw syngas by directly contacting the raw syngas with water to provide a cooled syngas and the first effluent.

10. The method of claim 1, wherein the thermally indestructible contaminants comprise hydrogen chloride, carbonyl sulfide, or a combination thereof.

11. The method of claim 1, wherein the thermally destructible contaminants comprise ammonia, and wherein the first effluent has an ammonia concentration of about 500 ppm to about 3 wt %.

12. A method for treating water, comprising:
   gasifying a hydrocarbon using one or more gasifiers to provide a raw syngas comprising one or more thermally destructible contaminants, and one or more thermally indestructible contaminants at an elevated temperature;
   cooling the raw syngas using contact and non-contact cooling to provide a cooled syngas and a first effluent comprising water, one or more thermally indestructible contaminants, and one or more thermally destructible contaminants;
   contacting the first effluent with steam to provide a second effluent comprising the steam and at least a portion of the one or more thermally indestructible contaminants and an intermediate comprising the water and at least a portion of the one or more thermally destructible contaminants;
   treating the second effluent within an acid gas unit in a hydrocarbon gasification process;
   stripping the intermediate with one or more oxidants to provide a third effluent comprising the one or more oxidants and at least a portion of the one or more thermally destructible contaminants and a fourth effluent comprising the water;
   destructing the thermally destructible contaminants in the third effluent using one or more combustion processes; and
   treating the fourth effluent for reuse.

13. The method of claim 12, further comprising:
   combusting at least a portion of the cooled syngas to provide an exhaust gas; and cooling the exhaust gas to provide the heat necessary to provide at least a portion of the steam.

14. The method of claim 12, wherein the one or more oxidants comprise air, oxygen, oxygen-enriched air, or any combination thereof.

15. The method of claim 12, wherein a weight ratio of the steam-to-first effluent ranges from about 1:1 to about 20:1.

16. The method of claim 12, wherein the concentration of the one or more oxidants in the intermediate is about 0.1% wt to about 5.0% wt.

17. The method of claim 12, wherein the pressure of the steam ranges from about 200 kPa to about 1,130 kPa.

18. The method of claim 12, wherein the one or more thermally indestructible contaminants comprise, hydrogen chloride, hydrogen sulfide, carbonyl sulfide, mixtures thereof, or any combination thereof.

19. The method of claim 12, wherein the hydrocarbon comprises polyethylene, polypropylene, polystyrene, polyethylene terephthalate (PET), or any combination thereof.

* * * * *